(12) United States Patent
Mayer et al.

(10) Patent No.: US 10,070,752 B2
(45) Date of Patent: Sep. 11, 2018

(54) POT LID HAVING A HANDLE

(71) Applicant: WMF Group GmbH, Geislingen/Steige (DE)

(72) Inventors: Roman Mayer, Schorndorf (DE); Reinhold Von Bank, Schemmerhofen (DE); Jochen Schobloch, Bad Buchau (DE)

(73) Assignee: WMF GROUP GMBH (DE)

( * ) Notice: Subject to any disclaimer, the term of this patent is extended or adjusted under 35 U.S.C. 154(b) by 42 days.

(21) Appl. No.: 14/778,752

(22) PCT Filed: Apr. 14, 2014

(86) PCT No.: PCT/EP2014/057483
§ 371 (c)(1),
(2) Date: Jul. 26, 2016

(87) PCT Pub. No.: WO2014/170249
PCT Pub. Date: Oct. 23, 2014

(65) Prior Publication Data
US 2017/0119206 A1   May 4, 2017

(30) Foreign Application Priority Data

Apr. 15, 2013 (DE) .................. 10 2013 006 471

(51) Int. Cl.
*B65D 25/28* (2006.01)
*A47J 36/06* (2006.01)
*A47J 45/06* (2006.01)

(52) U.S. Cl.
CPC ............. *A47J 36/06* (2013.01); *A47J 45/063* (2013.01)

(58) Field of Classification Search
CPC .......... A47J 36/06; A47J 45/063; A47J 45/08; A47J 45/085; A47J 45/066; B65D 25/28; B65D 25/2817; B65D 25/34; B65D 25/2802; B65D 25/2826
USPC ................. 220/753, 212.5, 912; 16/433, 441
See application file for complete search history.

(56) References Cited

U.S. PATENT DOCUMENTS

| 4,683,153 A * | 7/1987 | Goepfert ............. B29C 37/0082 156/100 |
| 4,794,666 A * | 1/1989 | Kim ..................... A47J 45/061 16/431 |
| 5,056,188 A | 10/1991 | Kramer et al. |

(Continued)

FOREIGN PATENT DOCUMENTS

| DE | 3220057 | 5/1982 |
| DE | 3249574 | 12/1982 |

(Continued)

OTHER PUBLICATIONS

Japanese Office Action issued in related Japanese Patent Application No. 2016-507006 dated Feb. 10, 2017.

(Continued)

*Primary Examiner* — Andrew T Kirsch
*Assistant Examiner* — Don M Anderson
(74) *Attorney, Agent, or Firm* — Gesmer Updegrove LLP

(57) ABSTRACT

The invention relates to a pan lid made of glass having a lid handle attached on the surface thereof directed outwards, the lid handle being connected to the glass surface via an adhesive connection.

9 Claims, 5 Drawing Sheets

(56) References Cited

U.S. PATENT DOCUMENTS

| | | | | |
|---|---|---|---|---|
| 5,196,153 | A | * | 3/1993 | Kramer ................ A47G 19/12 156/305 |
| 5,584,414 | A | * | 12/1996 | Neubeck ................ A47J 36/06 16/431 |
| 2006/0043093 | A1 | | 3/2006 | Cox et al. |
| 2015/0230665 | A1 | * | 8/2015 | Denny ................ A47J 45/063 220/753 |

FOREIGN PATENT DOCUMENTS

| | | |
|---|---|---|
| DE | 3826314 | 3/1990 |
| DE | 202013001944 | 3/2013 |
| DE | 202013001944 U1 | 3/2013 |
| EP | 1024161 | 12/1999 |
| JP | S53-98658 | 8/1978 |
| JP | H02-74573 | 3/1990 |
| JP | 2004-267251 | 9/2004 |
| JP | 2007-52943 | 3/2007 |
| WO | 0226087 | 4/2002 |
| WO | 0226087 A2 | 4/2002 |

OTHER PUBLICATIONS

Chinese Office Action issued in related Chinese Patent Application No. 201480001954.2 dated Jan. 4, 2016.

International Search Report dated Jun. 20, 2014 in connection with PCT/EP2014/057483.

International Preliminary Report on Patentability dated Oct. 29, 2015 in PCT Application No. PCT/EP2014/057483.

Office Action issued by the Chinese Patent Office dated Jun. 8, 2016 in Chinese Patent Application No. 201480001954.2.

Office Action dated Mar. 6, 2014 in German Application No. 102013006471.6.

Korean Office Action issued in related Korean Patent Application No. 10-2015-7000311 dated Oct. 26, 2017.

* cited by examiner

Fig. 3
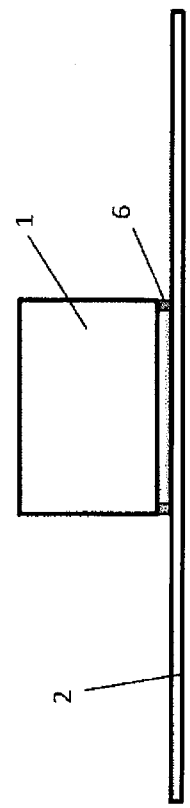
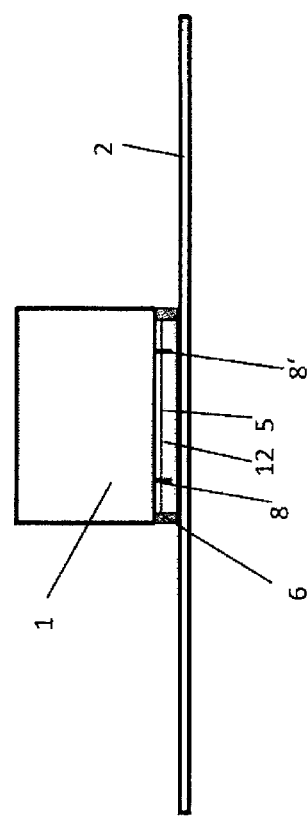

Fig. 4
a)
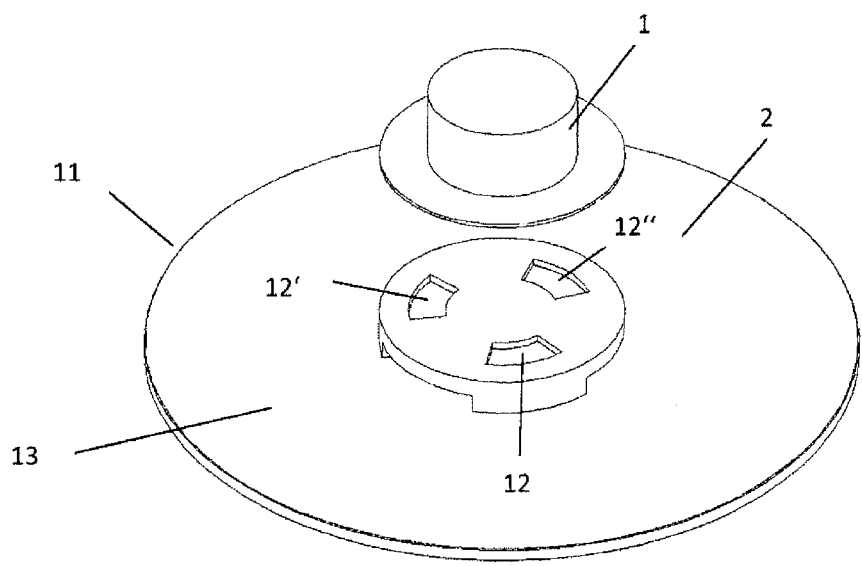
b)
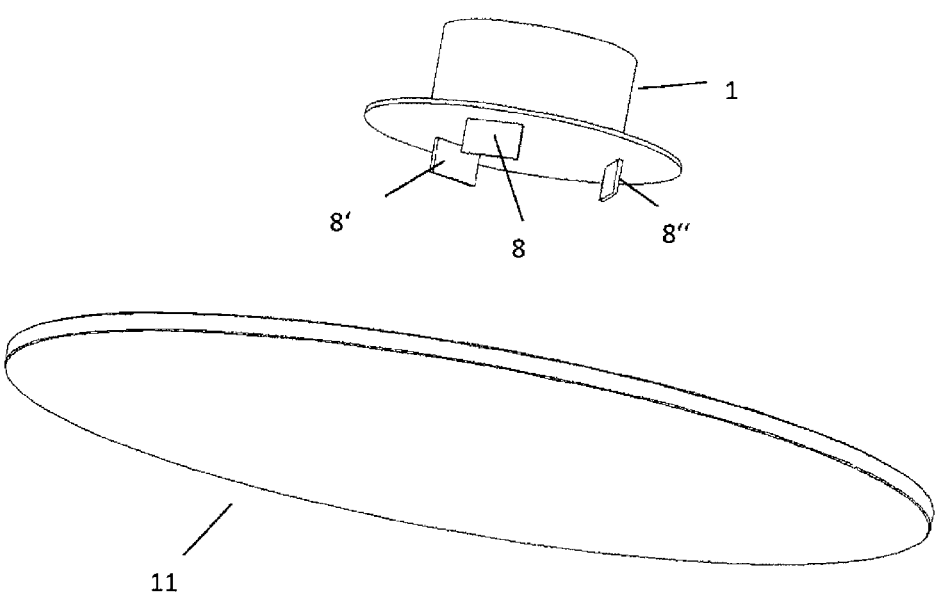

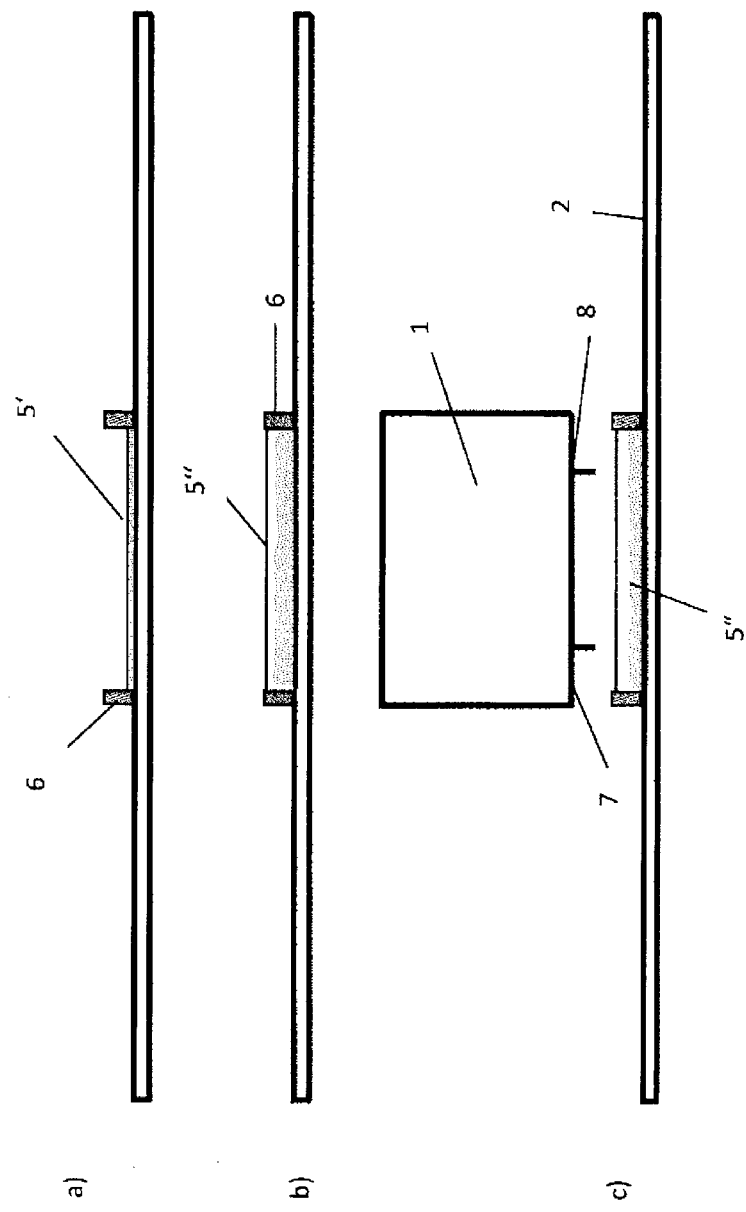

POT LID HAVING A HANDLE

PRIORITY INFORMATION

The present invention is a 371 National Phase Application of PCT/EP2014/057483 filed on Apr. 14, 2014 that claims priority to German Application No. 10 2013 006 471.6 filed on Apr. 15, 2013, which are incorporated herein by reference in their entireties.

BACKGROUND OF THE INVENTION

The invention relates to a pan lid made of glass having a lid handle attached on the surface thereof directed outwards, the lid handle being connected to the glass surface via an adhesive connection.

In the state of the art, it is known to attach handles to a pan lid, for example by means of screws or also by means of bolts. Generally such handles are configured as handle knobs or the like which have a rotationally symmetrical design, the attachment being effected centrally.

The handle can also be configured as a bow-type handle, it then being required to attach the latter to the pan lid at at least two attachment points in order to achieve a positionally secure arrangement and mounting and a non-rotatable attachment.

Normally, connecting the handles, i.e. both of the bow-type handle and of the handle knobs, which are also termed boss, is effected in the form of a screw connection.

In particular for the material combination of glass lid and stainless steel handle, difficulties arise however in the state of the art. In order to connect a stainless steel handle, for example in the form of a knob, to a glass lid, it is necessary firstly to introduce a boring into the glass surface in order then to guide the knob, which is provided with a screw, through the boring. Normally, the screw which is guided through the boring is screwed together with a nut. If a bow-type handle is provided, then of course two holes must be introduced so that then both can be attached by the screws guided through the holes.

It is hereby disadvantageous in particular:
an additional operation is then necessary in the glass machining in order to introduce the holes
the penetrating screw which conducts heat well leads to a hot handle
the position of the holes is associated with a high tolerance because of the typical properties of glass
the screw/nut on the inside of the lid represents a raised portion at which dirt can easily be trapped
in addition to the nut, also a sealing element which prevents a throughflow of steam during cooking is necessary, in order to separate the handle thermally and to prevent the accumulation of condensed water in/on the handle and in order to prevent water accumulating in the dishwasher due to unsealed places and dripping out when being taken out of the dishwasher.

SUMMARY OF THE INVENTION

Starting herefrom, it is the object of the present invention to produce a new glass lid-to-stainless steel handle connection which manages without a through-boring and this glass lid-to-stainless steel handle connection being intended to have all properties which are typical of a pan lid, such as thermal shock resistance and dishwasher suitability, and being suitable for contact with foodstuffs. In addition the glass lid-to-stainless steel handle connection should be visually appealing.

The invention is achieved by a pan lid made of glass having a lid handle attached to the surface thereof directed outwards, the underside of the lid handle being connected to the glass surface via at least one spacer, the spacer prescribing at least one cavity between the underside of the lid handle and the outer surface of the glass lid, and the cavity being filled at least partially with the adhesive connecting the lid handle to the glass surface. The sub-claims reveal advantageous developments.

Furthermore, the invention relates to a method for the production of an above-described glass lid-to-stainless steel handle connection having the features of patent claim 12.

With the solution according to the invention, a glass lid-to-stainless steel handle connection is available now for the first time, which connection is high-temperature resistant, dishwasher-proof and, at the same time, also thermal shock-resistant. The solution according to the invention is distinguished furthermore by being visually appealing also since, on the inside of the lid, no protruding attachment elements are present.

As a result of the fact that no additional operation for glass processing is required with the solution according to the invention and also no additional elements are required for attachment, such as penetrating screws, or nut and sealing rings, a very simple technical procedural solution is available, which is also economical at the same time.

In the case of the solution according to the invention, it is thereby preferred if the spacer is configured as a ring which surrounds the outer circumference of the underside of the lid handle. As a result, the area to be glued is restricted. The ring which is preferably configured as a silicone ring also has the function at the same time of ensuring rigidity, for example relative to tilting of the connection, and also of protecting the adhesive connection from damage due to manual influences (knives) or media (dishwasher) or similar. The invention thereby includes of course all embodiments which relate to different ring geometries and ring materials. A silicone ring is preferred, however the invention basically comprises also other materials for rings provided they are high-temperature-resistant, dishwasher-proof and thermal shock-resistant. The choice is left here to the discretion of the person skilled in the art. The ring can thereby have a round or also oval cross-section. Basically, also a rectangular cross-section is possible. It is preferred in all cases that the spacer, in the form of the ring, completely surrounds the outer circumference of the underside of the handle and also that the ring is adapted correspondingly in its dimensioning so that a visually appealing solution externally is produced and the ring preferably forms a flush seal with the side edges of the handle.

As an alternative to the above-described solution, the invention proposes in addition that the spacer is configured as a spacer plate which is adapted to the underside of the lid handle. This spacer plate must have at least one cavity which is provided in turn for the purpose of being filled completely or partially with adhesive. According to the invention, the spacer plate can be thereby have either a one-part or multipart configuration, there being understood by this according to the invention that the spacer plate as such is formed from one or two or a plurality of separate components. Such a spacer plate can therefore also be termed assembled spacer plate. The spacer plate can thereby have at least one, preferably two to four cavities. The advantage of such an embodiment with at least one cavity inside the spacer plate resides in the fact that the operation can take place with less adhesive and the adhesive connection hence takes place only via the cavities introduced in the spacer plate.

The dimensioning of the spacer plate can thereby be configured such that it is adapted exactly to the underside of the lid handle, whether configured now as a knob or as bow-type handle, or the spacer plate has a larger configuration and then forms an externally standing bead. However, it is essential in all cases that at least one cavity is disposed inside the spacer plates in order to ensure the connection.

The spacer plate as such can thereby be manufactured from any plastic materials. Injection moulded objects are preferred here. In the case of the material choice of the spacer plate, it should be taken into account again that the material choice is made such that the spacer plate is high-temperature-resistant, dishwasher-proof and thermal shock-resistant. Corresponding materials for forming such a spacer plate are known to the person skilled in the art. For example, this spacer plate can consist of polypropylene (PP), polyethylene (PE) or polycarbonate.

A further embodiment of the invention now proposes that at least one tab is disposed on the underside of the handle for additional connection. According to the invention, there is understood by a tab, raised portions which are disposed on the underside of the handle and which are dimensioned and disposed such that they are immersed in the adhesive. This solution has the advantage that a secure connection is ensured in the case of varying quantities of adhesive. The invention thereby comprises embodiments having at least two, but also up to ten, tabs which are disposed on the underside, it being essential respectively that the dimensioning of the tabs, i.e. the raised portions, is configured such that they are suitable for being immersed in the adhesive.

The cavity or the cavities which are defined by the spacer can be filled completely with adhesive, i.e. up to their upper edge. However a solution in which the adhesive fills the cavity only partially is preferred. As a result, during assembly of the glass lid-to-stainless steel handle connection according to the invention, the adhesive can also be prevented from being pressed out so that an untidy adhesive connection would then result.

In the case of the adhesives which can be used according to the invention, silicone adhesives are preferred. The silicone adhesive should thereby include a temperature band width of at least −40° C. to +50° C., preferably of −40° C. to +250° C., continuous temperature. These adhesives are condensation-crosslinking (based on acetic acid) and release therefore very few cleavage products since they concern 2K adhesives, the one component collecting a large part of the waste products of the other component.

According to the invention, also additional crosslinking silicone adhesives can be used, which have the advantage that they basically produce no cleavage products.

Apart from the silicone adhesives described above, also all other adhesives are suitable according to the invention which are able to join metal, i.e. stainless steel, to glass.

Furthermore, the invention relates to a method for the production of an above-described glass lid-to-stainless steel handle connection.

According to the invention, it is provided for this purpose that the spacer is injected directly onto the glass lid or else the spacer is placed on the glass lid and is connected to the surface of the glass lid by means of a first quantity of adhesive, i.e. with a first adhesive layer. In a further operation, when the spacer is already securely connected to the glass lid, adhesive can be introduced in one operation or also in a plurality of operations in order then to connect the handle either directly or by means of tabs to the surfaces. In the case where the spacer is already connected by means of a first adhesive layer also the second adhesive layer must then be applied in the next operation and then, subsequent thereto, the lid handle must be connected to the adhesive layer.

DETAILED DESCRIPTION OF THE ILLUSTRATED EMBODIMENTS

The invention is described subsequently in more detail with reference to five Figures.

FIG. 3 shows a further embodiment of a glass lid-to-stainless steel handle connection according to the invention via additional tabs.

FIG. 4 shows an embodiment according to the invention of the connection technique via a spacer plate.

FIG. 5 shows, in the Figure sequences 5A, 5B and 5C, the method for connecting the lid handle in the form of a knob to the glass surface of the lid.

Figure 1:
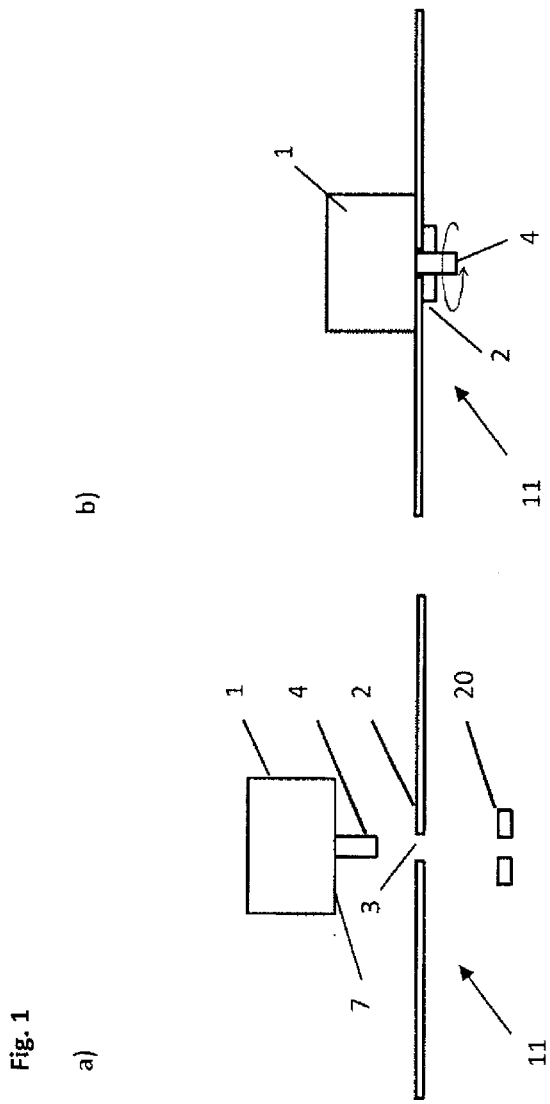
FIG. 1 shows schematically the construction and connection technique of a lid handle in the form of a knob to a glass lid according to the state of the art.

FIG. 1 now shows schematically a pan lid 11, the individual components which are required for connection of a knob 1 to a glass surface 2 of a pan lid 11 being cited in FIG. 1 a. The pan lid 11 thereby has a through-boring 3 which is provided for guiding through a screw 4 which is disposed on the underside 7 of the knob 1. For the connection, it is then necessary that the knob 1 with its screw 4 is guided through the through-opening 3 in order then to connect it to the nut 20.

As emerges from FIG. 1, it is hence required in the embodiment of the state of the art that, on the one hand, a through-boring 3 is introduced into the glass surface 2 of the pan lid 11. This is problematic inasmuch as the holes are indeed associated with certain tolerances because of the typical glass properties so that the result is not always secure retention of the screw in the through-opening. Furthermore, it is hereby disadvantageous that as a result of the fact that the screw 4 is guided through the glass surface 2 and that the latter then has contact with the inner hot media, the result is good heat conductance so that the knob 1 is heated. Furthermore, it is disadvantageous that the screw/nut on the inside of the lid represents a raised portion so that dirt can accumulate here.

FIG. 1 hence shows clearly that the connection according to the state of the art does not lead to a perfect technical functional solution and in addition is complex in production.

Figure 2:
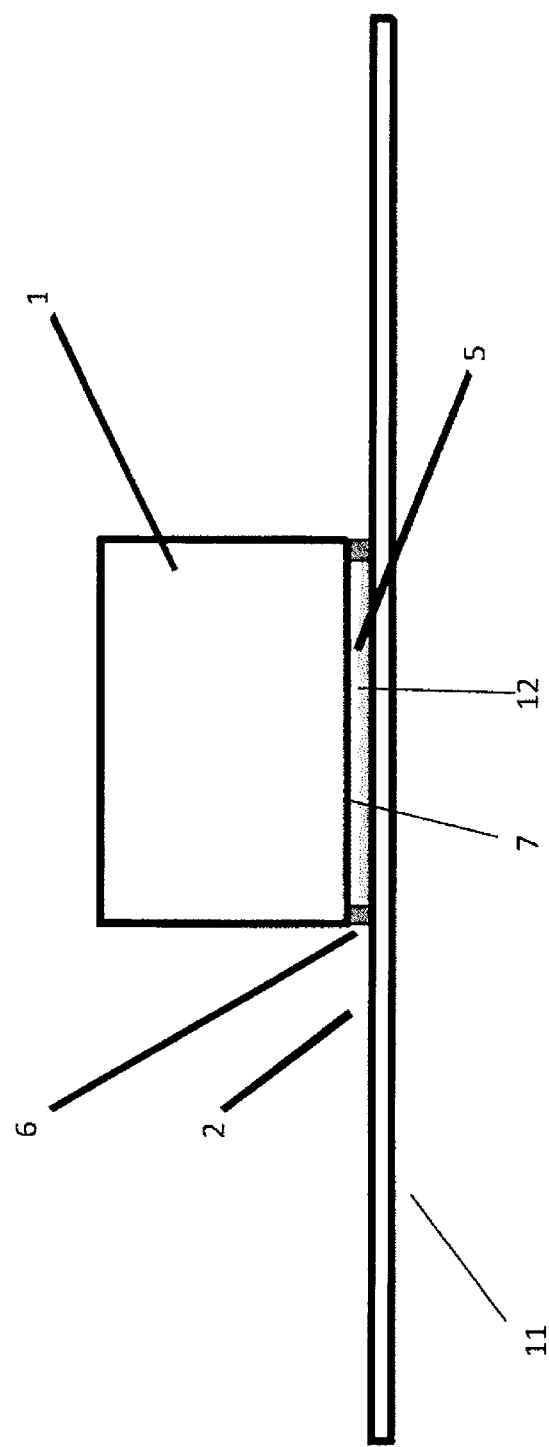
FIG. 2 shows schematically an embodiment of a glass lid-to-stainless steel handle connection according to the invention by means of adhesive.

In FIG. 2, a glass lid-to-stainless steel handle connection is now shown schematically in section. In FIG. 2, an embodiment of the invention is represented in which the handle 1 is configured as a knob and essentially has a rotationally symmetrical design. According to the present invention, the stainless steel handle 1 is now connected to the surface 2 of the pan lid 11 via its underside 7 by means of an adhesive 5. It is thereby essential to the invention that a spacer 6 is provided, which is configured in the form of a silicone ring, in the embodiment according to FIG. 2, and which completely surrounds the outer circumference of the underside 7 of the knob 1. The cavity 12 which is prescribed by the spacer 6 is filled, according to the invention, with an adhesive 5 which is a silicone adhesive in the case of the example. A connection is consequently now ensured which is high-temperature-resistant, dishwasher-proof and thermal shock-resistant. The spacer 6, which has a rectangular cross-section in the embodiment according to FIG. 2, has in addition also the function of ensuring rigidity relative to tilting of the connection and also of protecting the adhesive connection from damage due to manual influences or media.

According to the invention, a technical procedural solution which is very simple to achieve is made available hence for the first time, which solution overcomes in addition also the disadvantages of the state of the art and hence makes a connection available which fulfils all the technical requirements in use and in addition is also economical in production.

In FIG. 3*a*, FIG. 3 shows a full-surface adhesion of the knob 1 via a silicone ring 6, as described already in more detail in FIG. 2. In contrast hereto, FIG. 3*b* shows an adhesion via tabs 8, 8' in which the adhesive 5 does not completely fill the cavity surrounded by the ring 6. The tabs 8, 8' which are configured on the underside 7 of the knob 1 in the form of a raised portion, are now provided for the purpose of engaging in the adhesive 5 which is situated in the cavity 12 formed by the silicone ring 6. For this embodiment, it is thereby no longer required that the quantity of adhesive 5 is chosen such that it completely fills the cavity since in fact the connection is ensured by the tabs 8, 8' being immersed in the adhesive 5. The advantage of this embodiment resides in the fact that smaller quantities which are actually required for complete filling can be provided during metering of the adhesive 5 so that adhesive does not finish up being pressed out over the glass surface 2. If hence the adhesion is ensured via tabs 8, 8' or the like, a varying quantity of adhesive and/or a variation in height, volume of the spacer can be compensated for.

FIG. 4 now shows an embodiment in which a spacer plate 13 is provided as spacer. The spacer plate 13 is thereby disposed on the glass surface 2 of the glass lid 11 and has three cavities 12, 12' and 12". According to the invention, it is of course also possible that only two cavities or even more than three cavities are provided. In this embodiment, it is hence provided that the adhesion of the knob 1 to the surface 2 of the glass lid 11 is affected via the quantity of adhesive situated in the cavities 12, 12' and 12". For secure adhesion, it can thereby likewise be provided that, as shown in FIG. 4*b*, the knob 1 again has tabs 8, 8' and 8" on the underside. These tabs then engage exactly in the cavities 12, 12' and 12" so that a secure connection is consequently ensured.

FIG. 5 now shows, in the Figure sequence a), b) and c), the method for the production of the connection according to the invention.

According to the invention, it is provided for this purpose that, in a first step, the spacer 6 here in the form of a silicone ring is placed on the glass surface 2. Subsequently, then a first thin layer of adhesive 5' is applied and effects fixing of the ring 6 to the glass surface 2. In the second step, after hardening of the adhesive layer 5' of the first adhesive layer, a second adhesive layer 5" is applied. In the still unhardened state of the second adhesive layer 5", the knob 1 with its tab 8 disposed on the underside 7 is now pressed into the still unhardened adhesive layer 5".

This embodiment has the advantage that no silicone adhesive is pressed out beyond the spacer, i.e. between spacer 6 and the underside 7 of the knob 1 or between the glass surface 2 and below the spacer 6. According to the invention, it is of course also possible that the method is modified such that the spacer 6 is injected onto the glass surface 2 in a first operation (not illustrated) and that adhesive is then introduced in a second operation in order then to effect a connection with the tabs 8 which are disposed on the underside 7 of the knob.

What is claimed is:

1. A pan lid made of glass having a lid handle attached to the surface thereof directed outwards,
   wherein the underside of the lid handle is connected to the glass surface via at least one spacer,
   the spacer prescribing at least one cavity between the underside of the lid handle and the outer surface of the glass lid, and
   the at least one cavity being filled at least partially with the adhesive connecting the lid handle to the glass surface, wherein the handle is made of stainless steel and the spacer is configured as a silicone ring which surrounds the outer circumference of the underside of the lid handle.

2. The pan lid according to claim 1, wherein the underside of the lid handle is provided with at least one tab which engages in the adhesive situated in the at least one cavity.

3. The pan lid according to claim 1, wherein the quantity of adhesive is chosen such that the at least one cavity is filled completely.

4. The pan lid according to claim 1, wherein the quantity of adhesive is chosen such that the at least one cavity is filled only partially.

5. The pan lid according to claim 1, wherein the lid handle is configured in the form of a knob or as bow-type handle.

6. The pan lid according to claim 5, wherein the lid handle is configured as a knob with an essentially round cross-section.

7. The pan lid according to claim 1, wherein a polymerisation adhesive, polycondensation adhesive or a polyaddition adhesive is used as adhesive.

8. The pan lid according to claim 7, wherein the adhesive is a two-component adhesive based on silicone.

9. A method for the production of a pan lid having a glued lid handle according to claim 1, wherein
   a) the spacer is injected directly onto the glass lid and an adhesive layer is applied;
   or
   the spacer is connected to the surface of the glass lid by a first adhesive layer and a further layer is applied on the then hardened adhesive layer; and
   b) the lid handle is connected to the adhesive layer.

* * * * *